(12) United States Patent
Kuo et al.

(10) Patent No.: US 7,768,889 B2
(45) Date of Patent: Aug. 3, 2010

(54) LASER POWER CONTROL CIRCUIT AND METHOD THEREOF

(75) Inventors: Chung-Jen Kuo, Hsin-Chu (TW); Ming-Hsien Tsai, Kao-Hsiung (TW)

(73) Assignee: MediaTek Inc., Hsin-Chu (TW)

( * ) Notice: Subject to any disclaimer, the term of this patent is extended or adjusted under 35 U.S.C. 154(b) by 1382 days.

(21) Appl. No.: 11/161,891

(22) Filed: Aug. 21, 2005

(65) Prior Publication Data

US 2006/0077863 A1  Apr. 13, 2006

(30) Foreign Application Priority Data

Sep. 14, 2004  (TW)  .............................. 93127766 A (51) Int. Cl.
 *G11B 7/00* (2006.01)
(52) U.S. Cl. ..................... 369/53.26; 369/47.5; 369/116
(58) Field of Classification Search ........................ None
See application file for complete search history.

(56) References Cited

U.S. PATENT DOCUMENTS

| 7,196,996 B2 * | 3/2007 | Matsuda .................. 369/53.26 |
| 2003/0002407 A1 * | 1/2003 | Fujiwara ..................... 369/47.5 |
| 2004/0114472 A1 * | 6/2004 | Wang et al. ............... 369/13.26 |
| 2004/0130985 A1 * | 7/2004 | Chao ........................ 369/47.31 |
| 2004/0257940 A1 * | 12/2004 | Senga et al. ............. 369/47.26 |
| 2005/0002293 A1 * | 1/2005 | Hsu et al. .................. 369/47.5 |
| 2005/0002303 A1 * | 1/2005 | Kwon et al. ............. 369/53.26 |
| 2005/0036434 A1 * | 2/2005 | Lei ............................ 369/116 |

FOREIGN PATENT DOCUMENTS

TW  368649  9/1999

* cited by examiner

*Primary Examiner*—Lixi Chow
(74) *Attorney, Agent, or Firm*—Winston Hsu (57) ABSTRACT

A laser power control circuit includes a system control module for generating two write channel target values in a calibration mode, a driving module for driving a laser generator, and a detection module for detecting two laser power values of the laser generator. A write channel control module of the driving module generates two write channel signals according to the two write channel target values, respectively. The two laser power values respectively correspond to the two write channel signals. The system control module determines a first mapping relationship between a write channel target value and a laser power value according to the write channel target values and the laser power values. The system control module further determines a predetermined write channel target value corresponding to a predetermined laser power value according to the first mapping relationship in a run mode.

36 Claims, 6 Drawing Sheets

LASER POWER CONTROL CIRCUIT AND METHOD THEREOF

BACKGROUND

The present invention relates to a laser power control circuit and a method thereof, and more particularly, to a laser power control circuit of an optical disc drive and a method thereof.

As multimedia applications continue to progress, the demand for storing massive digital data increases rapidly. As a result, high storage volume and compact size optical storage media such as Compact Discs (CDs) or Digital Versatile Discs (DVDs) are becoming more and more popular, and optical storage devices such as CD drives or DVD drives have become standard accessories of personal computers, utilized for performing the multimedia applications mentioned above.

Take a CD-Recordable (CD-R) disc as an example. When an optical storage device writes data onto the CD-R disc, the magnitude of laser power of a laser diode (LD) in the optical storage device influences the writing quality of the CD-R disc, where control items of the laser power comprises stability and accuracy of the laser power. Typically, a closed loop control circuit in the optical storage device is utilized for maintaining the stability of the laser power. However, controlling the accuracy of the laser power is not seriously considered in the related art. It is common that in a manufacturing process of an optical storage device in the art, the laser power is calibrated according to a single laser power value, which is suitable for continuously outputting the laser. Therefore, the ability of the optical storage device to control the magnitude of the laser power of the LD is poor.

SUMMARY

It is an objective of the claimed invention to provide methods and circuits for controlling laser power.

An exemplary embodiment of a laser power control circuit comprises: a system control module for respectively generating a first write channel target value and a second write channel target value in a calibration mode; and a driving module coupled to the system control module for driving a laser generator. The driving module comprises: a write channel control module for generating a first write channel signal and a second write channel signal according to the first and second write channel target values, respectively; and a laser generator driving unit coupled to the write channel control module for driving the laser generator according to the first and second write channel signals. The laser power control circuit further comprises a detection module for detecting a first laser power value and a second laser power value of the laser generator, the first and second laser power values respectively corresponding to the first and second write channel signals. The system control module determines a first mapping relationship between a write channel target value and a laser power value according to the first and second write channel target values and the first and second laser power values. The system control module further determines a predetermined write channel target value corresponding to a predetermined laser power value according to the first mapping relationship in a run mode.

An exemplary embodiment of a laser power control method comprises: respectively generating a first write channel target value and a second write channel target value in a calibration mode; and driving a laser generator. The step of driving the laser generator comprises: generating a first write channel signal and a second write channel signal according to the first and second write channel target values, respectively; and driving the laser generator according to the first and second write channel signals. The laser power control method further comprises: detecting a first laser power value and a second laser power value of the laser generator, the first and second laser power values respectively corresponding to the first and second write channel signals; determining a first mapping relationship between a write channel target value and a laser power value according to the first and second write channel target values and the first and second laser power values; and determining a predetermined write channel target value corresponding to a predetermined laser power value according to the first mapping relationship in a run mode.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
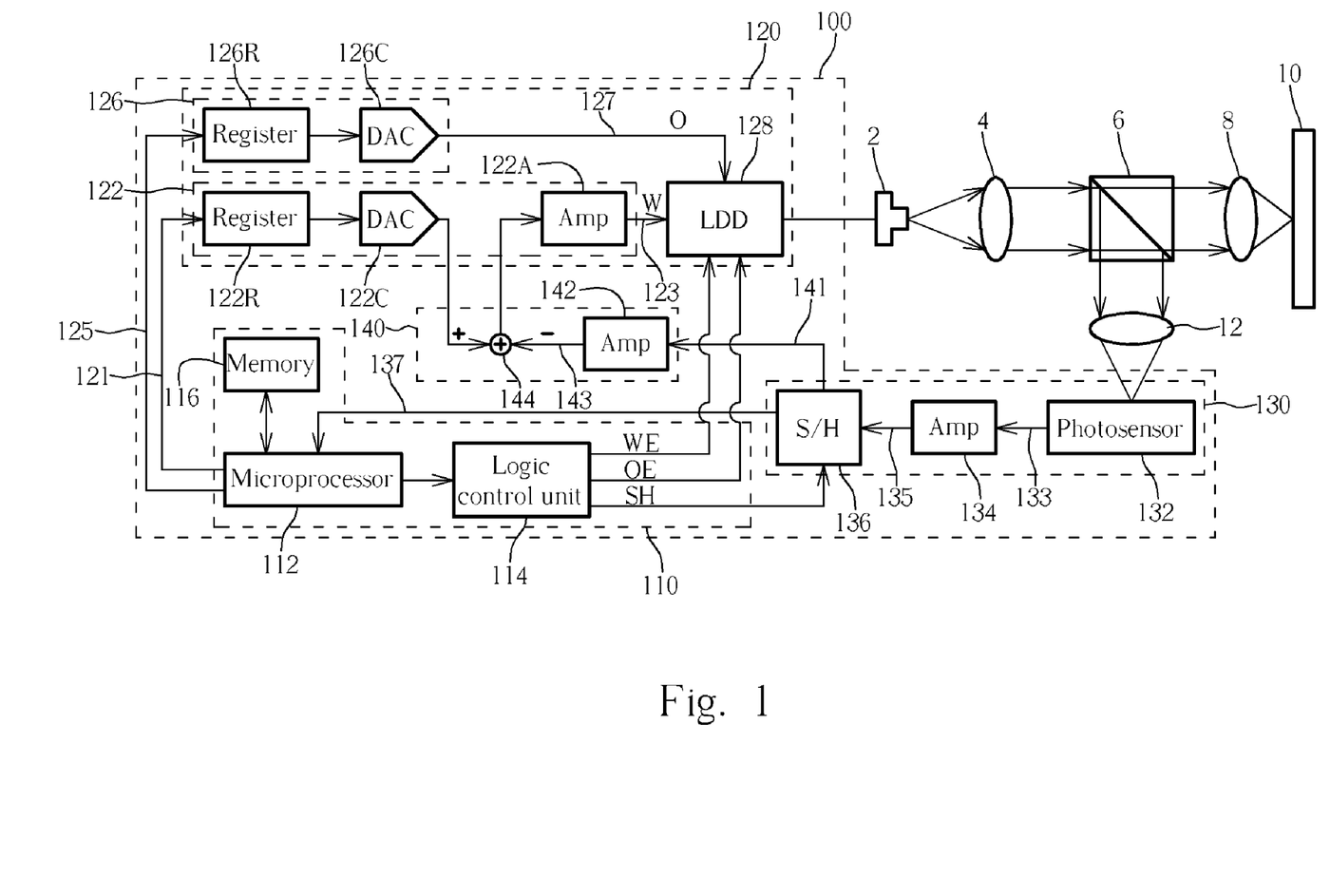
FIG. 1 is a diagram of a laser power control circuit according to one embodiment of the present invention.

Please refer to FIG. 1. FIG. 1 is a diagram of a laser power control circuit 100 according to one embodiment of the present invention. The laser power control circuit 100 is utilized for controlling the magnitude of laser power of a laser generator 2 of an optical storage device such as a CD drive or a DVD drive. The optical storage device utilizes the laser generator 2 to generate the laser. Through optical components 4, 6, and 8, the laser generated by the laser generator 2 is focused on the optical storage medium 10, which is an optical storage disc such as a CD-R disc, a DVD-R disc, a DVD-RW disc, a DVD+R disc, or a DVD+RW disc. As a result, the optical storage device is capable of accessing or writing the optical storage disc 10. As shown in FIG. 1, the laser power control circuit 100 comprises a system control module 110, a driving module 120, a detection module 130, and a feedback module 140. The system control module 110 comprises a microprocessor 112, a logic control unit 114, and a memory 116. The driving module 120 comprises a write channel control module 122, an overdrive (OD) channel control module 126, and a laser generator driving unit 128, where the write channel control module 122 comprises a register 122R, a digital-to-analog converter (DAC) 122C, and an amplifier 122A, and the overdrive channel control module 126 comprises a register 126R, and a DAC 126C. In this embodiment, the laser generator 2 is a laser diode (LD), and the laser generator driving unit 128 is a LD driver (LDD). In addition, the detection module 130 comprises a photosensor 132, an amplifier 134, and a sample/hold (S/H) unit 136, and the feedback module 140 comprises an amplifier 142 and an arithmetic unit 144.

In a calibration mode, the microprocessor 112 is capable of respectively generating two write channel target values WT1 and WT2, where a write channel target parameter 121 shown in FIG. 1 represents the write channel target values, i.e. the write channel target parameter 121 has a value such as the write channel target value WT1 or the write channel target value WT2. The write channel target parameter 121 can be stored in the register 122R. Respectively by utilizing the DAC 122C and the amplifier 122A, the write channel control module 122 is capable of performing digital-to-analog conversion according to the write channel target parameter 121 stored in the register 122R and performing signal amplification to generate a write channel signal 123 corresponding to the write channel target parameter 121. Additionally, the laser generator driving unit 128 drives the laser generator 2 according to the magnitude of the write channel signal 123 to generate the laser power corresponding to the magnitude of the write channel signal 123. When the value of the write channel target parameter 121 is equal to the write channel target value WT1, the write channel control module 122 generates a first write channel signal 123-1 corresponding to the write channel target value WT1 to be the write channel signal 123. When the value of the write channel target parameter 121 is equal to the write channel target value WT2, the write channel control module 122 generates a second write channel signal 123-2 corresponding to the write channel target value WT2 to be the write channel signal 123.

Similarly, the microprocessor 112 is capable of respectively generating two overdrive channel target values OT1 and OT2, where an overdrive channel target parameter 125 shown in FIG. 1 represents the overdrive channel target values, i.e. the overdrive channel target parameter 125 has a value such as the overdrive channel target value OT1 or the overdrive channel target value OT2. The overdrive channel target parameter 125 can be stored in the register 126R. By utilizing the DAC 126C, the overdrive channel control module 126 is capable of performing digital-to-analog conversion according to the overdrive channel target parameter 125 stored in the register 126R to generate an overdrive channel signal 127 corresponding to the overdrive channel target parameter 125. Additionally, the laser generator driving unit 128 drives the laser generator 2 according to the magnitude of the overdrive channel signal 127 to generate the laser power corresponding to the magnitude of the overdrive channel signal 127. When the value of the overdrive channel target parameter 125 is equal to the overdrive channel target value OT1, the overdrive channel control module 126 generates an overdrive channel signal 127-1 corresponding to the overdrive channel target value OT1 to be the overdrive channel signal 127. When the value of the overdrive channel target parameter 125 is equal to the overdrive channel target value OT2, the overdrive channel control module 126 generates an overdrive channel signal 127-2 corresponding to the overdrive channel target value OT2 to be the overdrive channel signal 127.

According to the control of the microprocessor 112, the logic control unit 114 is capable of generating a write channel enabling signal WE and an overdrive channel enabling signal OE, where the write channel enabling signal WE and the overdrive channel enabling signal OE are both utilized for driving the laser generator driving unit 128. In this embodiment, when the write channel enabling signal WE is at a high level WE_H and the overdrive channel enabling signal OE is at a low level OE_L, the laser generator driving unit 128 enables the control of the write channel signal 123 over the laser generator driving unit 128 and disables the control of the overdrive channel signal 127 over the laser generator driving unit 128. In this situation, the laser generator driving unit 128 drives the laser generator 2 to generate the laser having a laser power value Pw corresponding to the magnitude of the write channel signal 123. On the other hand, when the write channel enabling signal WE is at a low level WE_L and the overdrive channel enabling signal OE is at a high level OE_H, the laser generator driving unit 128 disables the control of the write channel signal 123 over the laser generator driving unit 128 and enables the control of the overdrive channel signal 127 over the laser generator driving unit 128. In this situation, the laser generator driving unit 128 drives the laser generator 2 to generate the laser having a laser power value Po corresponding to the magnitude of the overdrive channel signal 127. In addition, when the write channel enabling signal WE is at the high level WE_H and the overdrive channel enabling signal OE is at the high level OE_H, the laser generator driving unit 128 enables both the control of the write channel signal 123 over the laser generator driving unit 128 and the control of the overdrive channel signal 127 over the laser generator driving unit 128. In this situation, the laser generator driving unit 128 drives the laser generator 2 to generate the laser having a laser power value Psum corresponding to the magnitude of the write channel signal 123 and the magnitude of the overdrive channel signal 127. In this embodiment, the laser power value Psum is equal to the sum of the laser power values Pw and Po. Conversely, when the write channel enabling signal WE is at the low level WE_L and the overdrive channel enabling signal OE is at the low level OE_L, the laser generator driving unit 128 disables both the control of the write channel signal 123 over the laser generator driving unit 128 and the control of the overdrive channel signal 127 over the laser generator driving unit 128. In this situation, the laser generator 2 does not generate the laser.

In the detection module 130, the photosensor 132 is capable of converting at least one portion of the laser generated by the laser generator 2 into a voltage signal 133, and the amplifier 134 is capable of amplifying the voltage signal 133 to generate an amplified signal 135. It is noted that a first functionality of the S/H unit 136 of this embodiment is sampling the amplified signal 135 to generate a digital signal 137 and outputting the digital signal 137 to the microprocessor 112. As a result, the microprocessor 112 is capable of continuously monitoring the laser power value Psum of the laser generator 2. In addition, according to the control of the microprocessor 112, the logic control unit 114 further generates an S/H control signal SH. A second functionality of the S/H unit 136 of this embodiment is performing sampling or holding operation according to the S/H control signal SH and the amplified signal 135 to output an output signal 141 to the feedback module 140, so the feedback module 140 is capable of performing feedback control on the driving module 120. When the S/H control signal SH is at a high level SH_H, the S/H unit 136 performs sampling on the amplified signal 135; when the S/H control signal SH changes from the high level SH_H to a low level SH_L, the S/H unit 136 holds the latest sample value, i.e. the sample value corresponding to the time when the S/H control signal SH changes from the high level SH_H to the low level SH_L.

In the feedback module 140, the amplifier 142 is capable of amplifying the output signal 141 to generate a feedback signal 143, and the arithmetic unit 144 is capable of adjusting the magnitude of the write channel signal 123 according to the feedback signal 143. When the value of the write channel target parameter 121 is equal to the write channel target value WT1, the feedback signal 143 is a first feedback signal 143-1. In this situation, the arithmetic unit 144 adjusts the first write channel signal 123-1 according to the first feedback signal 143-1. When the value of the write channel target parameter 121 is equal to the write channel target value WT2, the feedback signal 143 is a second feedback signal 143-2. In this situation, the arithmetic unit 144 adjusts the second write channel signal 123-2 according to the second feedback signal 143-2. Through the feedback control of the control module 140 on the driving module 110, the laser power control circuit 100 is capable of maintaining the stability of the laser power value Psum of the laser generator 2.

It is noted that the laser power control circuit 100 of this embodiment is capable of utilizing the microprocessor 112 to calculate the laser power value Psum represented by the digital signal 137, where the opto-electronic conversion curve of the photosensor 132 and the gain of the amplifier 134 are well known, and the related information thereof can be stored in the memory 116. A simple method for implementing this is storing a lookup table in the memory 116, where the lookup table represents a mapping relationship between the value of the digital signal 137 and the laser power value detected by the photosensor 132. However, the simple method mentioned above is not a limitation of the present invention.

Figure 2:
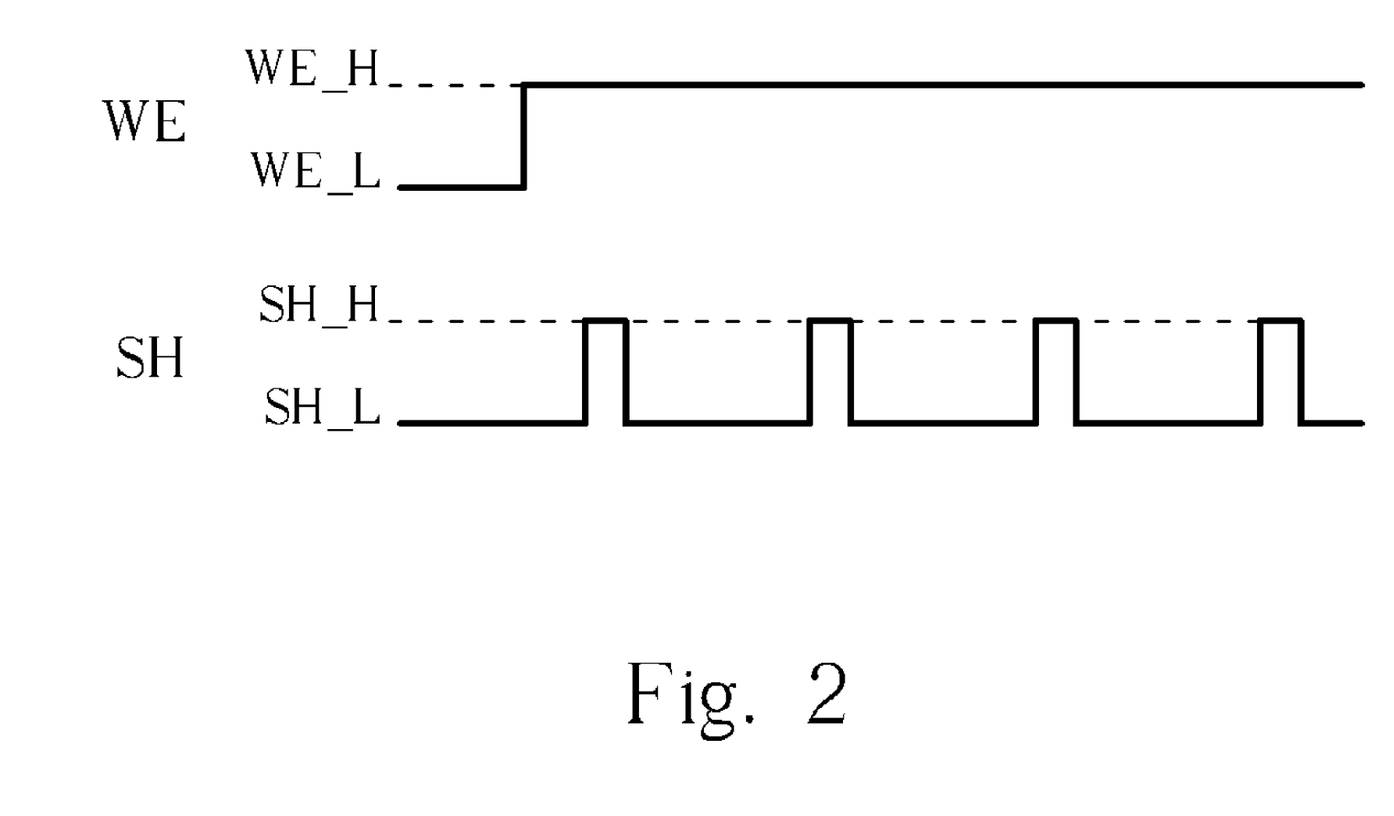
FIG. 2 is a diagram of control signals of a first calibration procedure according to the present invention.

Please refer to FIG. 1 and FIG. 2. FIG. 2 illustrates control signals such as the write channel enabling signal WE and the S/H control signal SH of the laser power control circuit 100 in a first calibration procedure, where the overdrive channel enabling signal OE mentioned above is continuously at the low level OE_L mentioned above and therefore not shown in FIG. 2. The first calibration procedure is utilized for calibrating a first mapping relationship between the write channel target parameter 121 and the laser power value Pw. Therefore, in the first calibration procedure, the laser power value Psum is equal to the laser power value Pw. In the calibration mode, the microprocessor 112 is capable of determining the first mapping relationship between a write channel target value WT and the laser power value Pw according to the first calibration procedure, where the first mapping relationship can be described utilizing the following equation:

$$WT = m*Pw + b$$

As mentioned above, when the value of the write channel target parameter 121 is equal to the write channel target value WT1, the write channel control module 122 generates the first write channel signal 123-1 correspondingly. In this situation, the detection module 130 detects a first laser power value Pw1 of the laser generator 2, where the first laser power value Pw1 corresponds to the first write channel signal 123-1. As mentioned above, when the value of the write channel target parameter 121 is equal to the write channel target value WT2, the write channel control module 122 generates the second write channel signal 123-2 correspondingly. In this situation, the detection module 130 detects a second laser power value Pw2 of the laser generator 2, where the second laser power value Pw2 corresponds to the second write channel signal 123-2. Both of the laser power values Pw1 and Pw2 mentioned above are special cases of the laser power value Pw. As a result, the microprocessor 112 is capable of calculating control parameters m and b, which need to be calibrated, according to the following equation:

$$WT1 = m*Pw1 + b$$

$$WT2 = m*Pw2 + b$$

After generating the control parameters m and b mentioned above, the microprocessor 112 stores the control parameters m and b in the memory 116. In this embodiment, the memory 116 is a non-volatile memory, so even the optical storage device lacks for power for a while, the data of the control parameters m and b will not be lost. In a run mode, the microprocessor 112 is capable of controlling the laser power of the laser generator 2 according to control parameters stored in the memory 116 (for example, the control parameters m and b). As a result, the system control module 110 is capable of determining a predetermined write channel target value (for example, the write channel target value WT) corresponding to a predetermined laser power value (for example the laser power value Pw) according to the first mapping relationship represented by the control parameters m and b.

Figure 3:
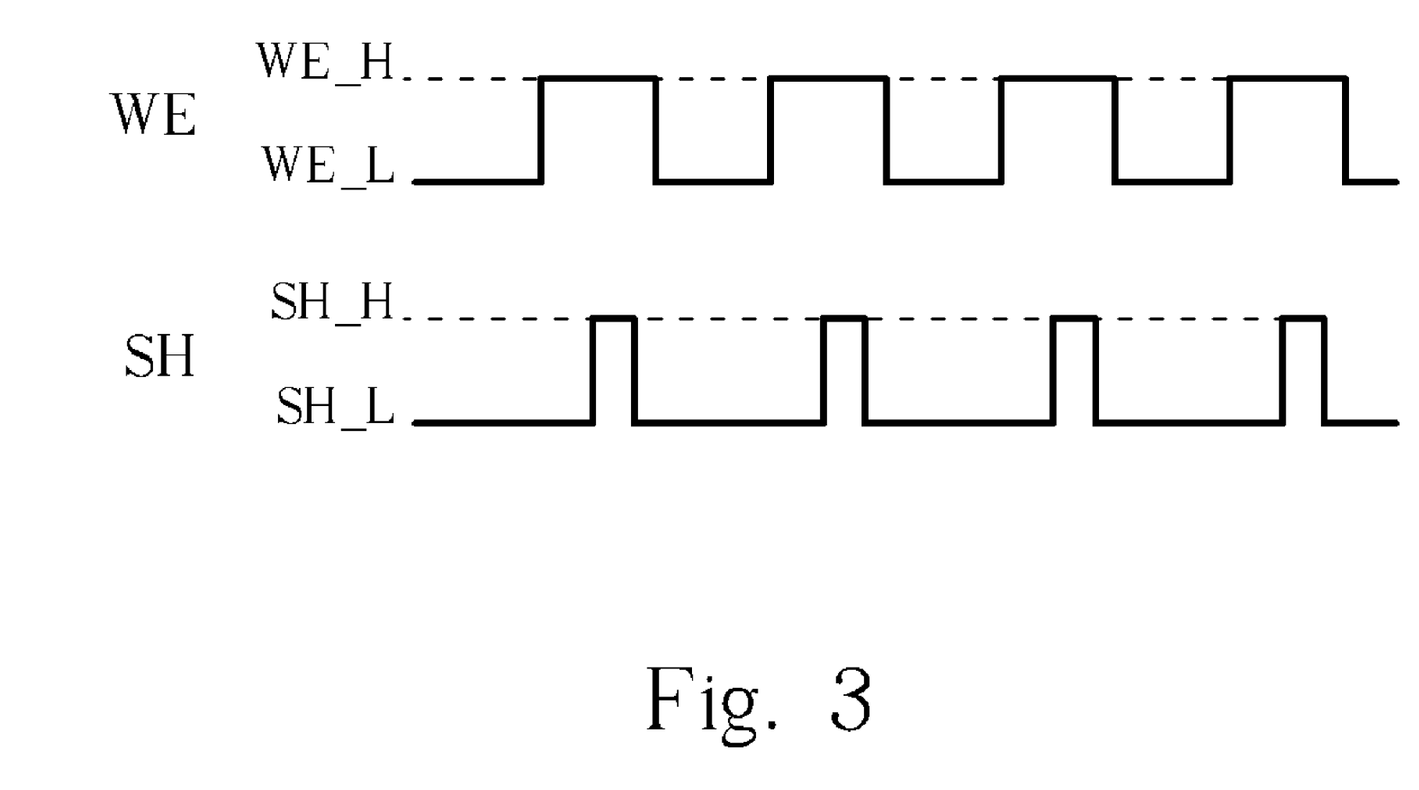
FIG. 3 is a diagram of control signals of a second calibration procedure according to the present invention.

Please refer to FIG. 1 and FIG. 3. FIG. 3 illustrates control signals such as the write channel enabling signal WE and the S/H control signal SH of the laser power control circuit 100 in a second calibration procedure, where the overdrive channel enabling signal OE mentioned above is continuously at the low level OE_L mentioned above and therefore not shown in FIG. 3. The second calibration procedure is similar to the first calibration procedure, and the differences between them are described as follows. In the second calibration procedure, the write channel enabling signal WE has a duty cycle of 50%. That is, in each period thereof, the ratio of the time when the write channel enabling signal WE is at the high level WE_H to the period is 50%. In the second calibration procedure, the laser power control circuit 100 of this embodiment is capable of utilizing the microprocessor 112 to calculate an average value Pw_avg of the digital signal 137 and calculate the laser power values Pw1 and Pw2 according to the duty cycle mentioned above and the average value Pw_avg. When the value of the write channel target parameter 121 is equal to the write channel target value WT1, the average value Pw_avg is a first average value Pw_avg1, and the laser power value Pw1 is a peak value (of the laser power value Pw) corresponding to the high level WE_H of the write channel enabling signal WE. Therefore, the laser power value Pw1 is equal to the first average value Pw_avg1 divided by the duty cycle. Taking the duty cycle of 50% as an example, the laser power value Pw1 is twice as large as the first average value Pw_avg1. In addition, when the value of the write channel target parameter 121 is equal to the write channel target value WT2, the average value Pw_avg is a second average value Pw_avg2. Similarly, the laser power value Pw2 is twice as large as the second average value Pw_avg2. Given:

$$WT1 = m*Pw1 + b$$

$$WT2 = m*Pw2 + b$$

$$Pw1 = 2*Pw\_avg1$$

$$Pw2 = 2*Pw\_avg2$$

The following equations can be derived:

$$WT1 = 2m*Pw\_avg1 + b$$

$$WT2 = 2m*Pw\_avg2 + b$$

As a result, the microprocessor 112 is capable of calculating the control parameters m and b, which need to be calibrated, according to the two equations listed above.

Figure 4:
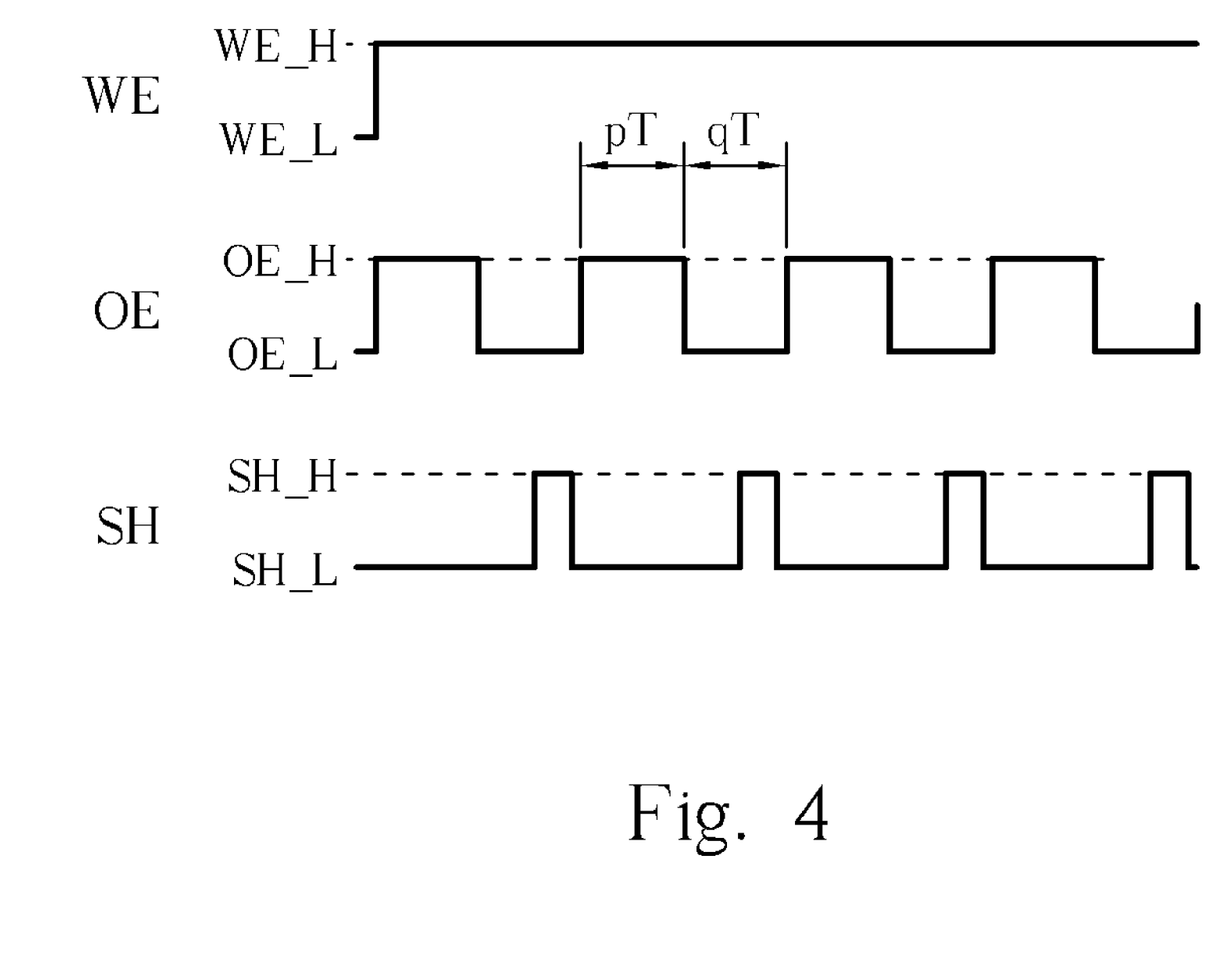
FIG. 4 is a diagram of control signals of a third calibration procedure according to the present invention.

Please refer to FIG. 4. FIG. 4 illustrates control signals such as the write channel enabling signal WE, the overdrive channel enabling signal OE, and the S/H control signal SH of the laser power control circuit 100 in a third calibration procedure, where the write channel enabling signal WE and the S/H control signal SH respectively have the same waveforms as those in the first calibration procedure, and the overdrive channel enabling signal OE has a duty cycle of (p/(p+q)). The third calibration procedure is utilized for calibrating a second mapping relationship between the overdrive channel target parameter 125 and the laser power value Po. The second mapping relationship can be described utilizing the following equation:

$$OT = m\_o * Po + b\_o$$

In the third calibration procedure, the microprocessor 112 is capable of determining a predetermined write channel target value WT_x corresponding to a predetermined laser power value Pw_x according to the control parameters m and b generated in the first calibration procedure, and sending the predetermined write channel target value WT_x to the register 122R. In addition, the laser power control circuit 100 is capable of utilizing the microprocessor 112 to calculate an average value Psum_avg of the digital signal 137, where the average value Psum_avg is also a laser power value. As mentioned above, the laser power value Psum_avg is equal to the sum of the laser power value Pw_x and the laser power value Po_avg, and this relationship can be described utilizing the following equation:

$$P\text{sum\_avg} = Pw\_x + Po_{13}\text{avg}$$

In the equation mentioned above, the laser power value Po_avg is also an average value. The laser power value Po involved in the second mapping relationship is a peak value corresponding to the high level OE_H of the overdrive channel enabling signal OE. Similarly, the laser power value Po is equal to the average value Po_avg divided by the duty cycle of the overdrive channel enabling signal OE. That is, the average value Po_avg is equal to the laser power value Po multiplied by the duty cycle of the overdrive channel enabling signal OE, and this relationship can be described utilizing the following equation:

$$Po\_\text{avg} = Po * p/(p+q)$$

The laser power value Po_avg in the equation mentioned above can be substituted for that in the previous equation, and therefore the following equation is derived:

$$P\text{sum\_avg} = Pw\_x + Po * p/(p+q)$$

When the value of the overdrive channel target parameter 125 is equal to the overdrive channel target values OT1, the average value Psum_avg is a first average value Psum_avg1, and the laser power value Po is a first laser power value Po1. In addition, when the value of the overdrive channel target parameter 125 is equal to the overdrive channel target values OT2, the average value Psum_avg is a second average value Psum_avg2, and the laser power value Po is a second laser power value Po2. As a result, the microprocessor 112 is capable of calculating the laser power values Po1 and Po2 according to the following equations:

$$P\text{sum\_avg1} = Pw\_x + Po1 * p/(p+q)$$

$$P\text{sum\_avg2} = Pw\_x + Po2 * p/(p+q)$$

After deriving the laser power values Po1 and Po2, the microprocessor 112 is capable of calculating the control parameters m_o and b_o according to the following equations:

$$OT1 = m\_o * Po1 + b\_o$$

$$OT2 = m\_o * Po2 + b\_o$$

Similarly, after generating the control parameters m_o and b_o mentioned above, the microprocessor 112 stores the control parameters m_o and b_o in the memory 116. In the run mode, the microprocessor 112 is capable of controlling the laser power of the laser generator 2 according to the control parameters m, b, m_o, and b_o. In this embodiment, the control parameter b_o can be assumed to be zero in an ideal situation, so only the control parameter m_o needs to be calculated. However, the assumption mentioned above is not a limitation of the present invention. In addition, as shown in FIG. 4, the time interval when the S/H control signal SH is at the high level SH_H is within the time interval when the overdrive channel enabling signal OE is at the low level OE_L. As a result, the influence of the overdrive channel control module 126 on the feedback control of the feedback module 140 over the write channel control module 122 can be avoided.

Figure 5:
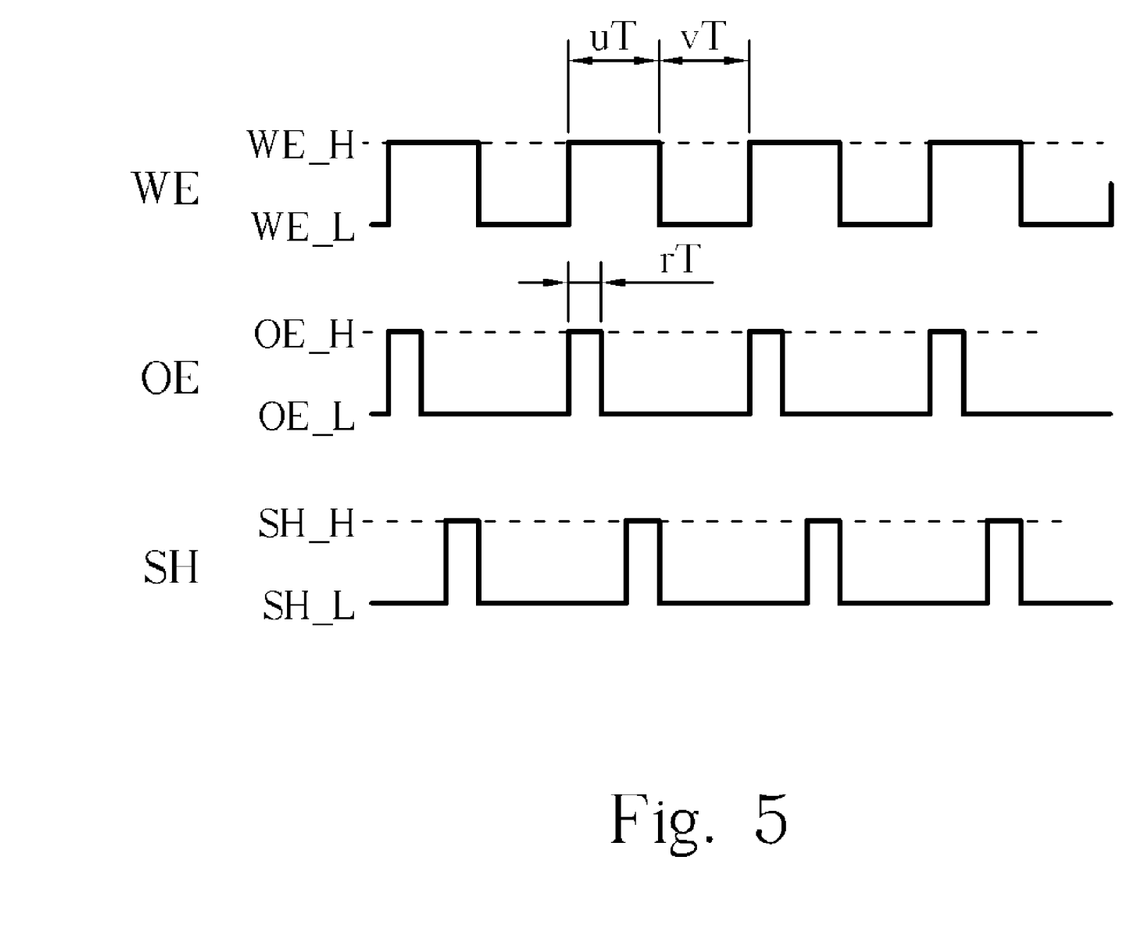
FIG. 5 is a diagram of control signals of a fourth calibration procedure according to the present invention.

Please refer to FIG. 5. FIG. 5 illustrates control signals such as the write channel enabling signal WE, the overdrive channel enabling signal OE, and the S/H control signal SH of the laser power control circuit 100 in a fourth calibration procedure, where the write channel enabling signal WE has a duty cycle of (u/(u+v)), and the overdrive channel enabling signal OE has a duty cycle of (r/(u+v)). In this embodiment, the write channel enabling signal WE is described utilizing a duty cycle of 50%, so the write channel enabling signal WE and the S/H control signal SH respectively have the same waveforms as those in the second calibration procedure. Similarly, the fourth calibration procedure is also utilized for calibrating the second mapping relationship between the overdrive channel target parameter 125 and the laser power value Po. As described in the third calibration procedure, the second mapping relationship can be described utilizing the following equation:

$$OT = m\_o * Po + b\_o$$

In the fourth calibration procedure, the microprocessor 112 is capable of determining a predetermined write channel target value WT_y corresponding to a predetermined laser power value Pw_y according to the control parameters m and b generated in the second calibration procedure, and sending the predetermined write channel target value WT_y to the register 122R, where the predetermined laser power value Pw_y is a peak value (of the laser power value Pw_avg) corresponding to the high level WE_H of the write channel enabling signal WE. In addition, the laser power control circuit 100 is capable of utilizing the microprocessor 112 to calculate the laser power value Psum_avg represented by the digital signal 137. As mentioned above, the laser power value Psum_avg is equal to the sum of the laser power value Pw_avg and the laser power value Po_avg, where this relationship can be described utilizing the following equation:

$$P\text{sum\_avg} = Pw\_\text{avg} + Po\_\text{avg}$$

In the equation mentioned above, the laser power value Pw_avg is also an average value, and the laser power value Po_avg is also an average value. Similarly, the average value Pw_avg is equal to the laser power value Pw_y multiplied by the duty cycle of the write channel enabling signal WE, and the average value Po_avg is equal to the laser power value Po multiplied by the duty cycle of the overdrive channel enabling signal OE. These relationships can be described utilizing the following equations:

$$Pw\_\text{avg} = Pw\_y * u/(u+v)$$

$$Po\_\text{avg} = Po * r/(u+v)$$

The laser power values Pw_avg and Po_avg in the equations mentioned above can be substituted for those in the previous equation, and therefore the following equation is derived:

$$P\text{sum\_avg} = Pw\_y * u/(u+v) + Po * r/(u+v)$$

As mentioned above, when the value of the overdrive channel target parameter 125 is equal to the overdrive channel target values OT1, the average value Psum_avg is a first average value Psum_avg1, and the laser power value Po is a first laser power value Po1. Additionally, as mentioned above, when the value of the overdrive channel target parameter 125 is equal to the overdrive channel target values OT2, the average value Psum_avg is a second average value Psum_avg2, and the laser power value Po is a second laser power value Po2. As a result, the microprocessor 112 is capable of calculating the laser power values Po1 and Po2 according to the following equations:

$$Psum\_avg1=Pw\_y*u/(u+v)+Po1*r/(u+v)$$

$$Psum\_avg2=Pw\_y*u/(u+v)+Po2*r/(u+v)$$

After deriving the laser power values Po1 and Po2, the microprocessor 112 is capable of calculating the control parameters m_o and b_o according to the following equations:

$$OT1=m\_o*Po1+b\_o$$

$$OT2=m\_o*Po2+b\_o$$

Similarly, after generating the control parameters m_o and b_o mentioned above, the microprocessor 112 stores the control parameters m_o and b_o in the memory 116. In the run mode, the microprocessor 112 is capable of controlling the laser power of the laser generator 2 according to the control parameters m, b, m_o, and b_o stored in the memory 116.

Figure 6:
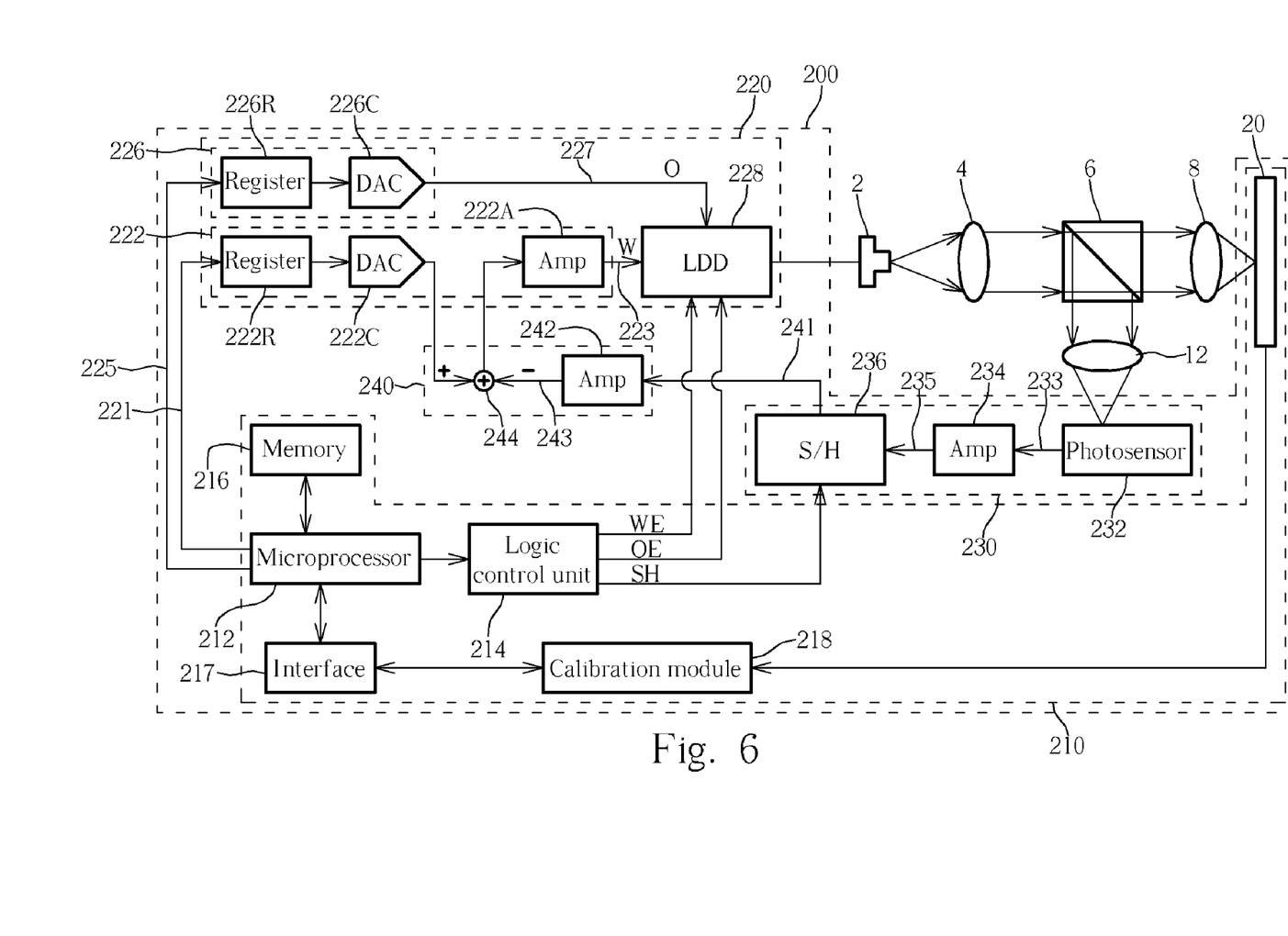
FIG. 6 is a diagram of a laser power control circuit according to another embodiment of the present invention.

Please refer to FIG. 6. FIG. 6 is a diagram of a laser power control circuit 200 according to a second embodiment of the present invention. The second embodiment is similar to the first embodiment, where the differences between them are described as follows. The laser power control circuit 200 comprises a system control module 210, a driving module 220, a detection module 230, and a feedback module 240 respectively corresponding to the system control module 110, the driving module 120, the detection module 130, and the feedback module 140 shown in FIG. 1. In contrast to the system control module 110 mentioned above, the system control module 210 of the second embodiment further comprises an interface 217, a calibration module 218, and a photosensor 20. In the run mode, the photosensor 20 is positioned at a location corresponding to that of the optical storage disc 10 shown in FIG. 1. The photosensor 20 is capable of converting at least one portion of the laser generated by the laser generator 2 into a voltage signal, and the calibration module 218 is capable of generating the control parameters m, b, m_o, and b_o according to the voltage signal, where the opto-electronic conversion curve of the photosensor 20 is well known, and the related information thereof can be stored in the calibration module 218 in advance. An applicable method for implementing this is storing a lookup table in the calibration module 218, where the lookup table represents a mapping relationship between the value representing the magnitude of the voltage signal and the laser power value detected by the photosensor 20. However, the simple method mentioned above is not a limitation of the present invention. The first, second, third, and fourth calibration procedures mentioned above are all applicable to this embodiment, where the calibration module 218 is capable of controlling the microprocessor 212 through the interface 217 to perform the related control needed in the first, second, third, and fourth calibration procedures. For example, the calibration module 218 controls the microprocessor 212 through the interface 217, so the logic control unit 214 generates control signals such as the write channel enabling signal WE, the overdrive channel enabling signal OE, and the S/H control signal SH mentioned above. Additionally, the calibration module 218 controls the microprocessor 212 through the interface 217 to generate the write channel target parameter 221 and the overdrive channel target parameter 225 and store the control parameters m, b, m_o, and b_o in the memory 216, which is also a non-volatile memory. In this embodiment, the calibration module 218 is a computer, and the interface 217 complies with Integrated Device Electronics (IDE) specifications. The calibration module 218 is capable of detecting the laser power of the laser generator 2 through the photosensor 20, so the S/H unit 236 of the detection module 230 has no need to generate or output a signal such as the digital signal 137 shown in FIG. 1. That is, the S/H unit 236 of this embodiment does not need the first functionality of the S/H unit 136 of the first embodiment.

It is noted that in the run mode, the photosensor 20 and the calibration module 218 are capable of being removed from the system control module 210. In this situation, the microprocessor 212 is capable of controlling the magnitude of laser power of a laser generator 2 according to the control parameters m, b, m_o, and b_o stored in the memory 216. In addition, an optical storage disc such as the optical storage disc 10 shown in FIG. 1 can be installed at the location where the photosensor 20 is positioned in FIG. 6, so the optical storage device is capable of accessing or burning the optical storage disc 10.

It is an advantage of the present invention that the present invention apparatus and method are capable of determining a predetermined write channel target value corresponding to a predetermined laser power value according to the first mapping relationship, and therefore the accuracy of the laser power control can be increased.

It is another advantage of the present invention that the present invention apparatus and method further utilize the laser output having the pulse form to calibrate the laser power, and therefore the accuracy of the laser power control can be increased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A laser power control circuit comprising:
    a system control module for respectively generating a first write channel target value, a second write channel target value, a first overdrive channel target value and a second overdrive channel target value in a calibration mode
    a driving module coupled to the system control module for driving a laser generator, the driving module comprising:
        a write channel control module for generating a first write channel signal and a second write channel signal according to the first and second write channel target values, respectively;
        a laser generator driving unit coupled to the write channel control module for driving the laser generator according to the first and second write channel signals; and
        an overdrive channel control module coupled to the laser generator driving unit and the system control module for generating a first overdrive channel signal and a second overdrive channel signal according to the first and second overdrive channel target values, respectively; and a detection module for detecting a first laser power value and a second laser power value of the laser generator, the first and second laser power values respectively corresponding to the first and second write channel signals;

wherein the system control module comprises a logic control unit coupled to the laser generator driving unit for driving the laser generator driving unit according to a second duty cycle to drive the laser generator according to the first and second overdrive channel signals, the system control module determines a first mapping relationship between a write channel target value and a laser power value according to the first and second write channel target values and the first and second laser power values, and the system control module determines a predetermined write channel target value corresponding to a predetermined laser power value according to the first mapping relationship in a run mode.

2. The laser power control circuit of claim 1, further comprising:

a feedback module coupled to the driving module and the detection module for adjusting the first and second write channel signals according to the first and second laser power values, respectively.

3. The laser power control circuit of claim 1, wherein the write channel control module further comprises:

a register for storing the first and second write channel target values; and a digital-to-analog converter (DAC) coupled to the register for performing digital-to-analog conversion according to the first and second write channel target values to generate the first and second write channel signals, respectively.

4. The laser power control circuit of claim 1, wherein the logic control unit further drives the laser generator driving unit according to a first duty cycle to drive the laser generator according to the first and second write channel signals.

5. The laser power control circuit of claim 4, wherein the system control module further comprises:

a microprocessor coupled to the logic control unit for calculating the first mapping relationship or controlling the first duty cycle.

6. The laser power control circuit of claim 4, wherein the detection module detects a third laser power value and a fourth laser power value of the laser generator, the third and fourth laser power values respectively correspond to the first and second overdrive channel signals, the system control module determines a second mapping relationship between an overdrive channel target value and a laser power value according to the first mapping relationship, the first and second overdrive channel target values, and the third and fourth laser power values, and the system control module further determines a predetermined overdrive channel target value corresponding to a predetermined laser power value according to the first and second mapping relationships in the run mode.

7. The laser power control circuit of claim 6, wherein the system control module further comprises:

a microprocessor coupled to the logic control unit for calculating the first and second mapping relationships or controlling the first and second duty cycles.

8. The laser power control circuit of claim 4, wherein the overdrive channel control module further comprises:

a register for storing the first and second overdrive channel target values; and a digital-to-analog converter (DAC) coupled to the register for performing digital-to-analog conversion according to the first and second overdrive channel target values to generate the first and second overdrive channel signals, respectively.

9. The laser power control circuit of claim 4, wherein the second duty cycle is equal to the first duty cycle.

10. The laser power control circuit of claim 1, wherein the detection module detects a third laser power value and a fourth laser power value of the laser generator, the third and fourth laser power values respectively correspond to the first and second overdrive channel signals, the system control module determines a second mapping relationship between an overdrive channel target value and a laser power value according to the first mapping relationship, the first and second overdrive channel target values, and the third and fourth laser power values, and the system control module further determines a predetermined overdrive channel target value corresponding to a predetermined laser power value according to the first and second mapping relationships in the run mode.

11. The laser power control circuit of claim 10, wherein the system control module further comprises:

a microprocessor coupled to the logic control unit for calculating the first and second mapping relationships or controlling the second duty cycle.

12. The laser power control circuit of claim 1, wherein the overdrive channel control module further comprises:

a register for storing the first and second overdrive channel target values; and a digital-to-analog converter (DAC) coupled to the register for performing digital-to-analog conversion according to the first and second overdrive channel target values to generate the first and second overdrive channel signals, respectively.

13. The laser power control circuit of claim 1, wherein the detection module further comprises:

a photosensor for converting at least one portion of the laser generated by the laser generator into a voltage signal; and a sample/hold (S/H) unit coupled to the photosensor and the system control module for performing S/H operation according to the voltage signal and control of the system control module.

14. The laser power control circuit of claim 1, wherein the system control module further comprises:

a non-volatile memory for storing a plurality of control parameters generated by the system control module in the calibration mode, the control parameters at least having information corresponding to the first mapping relationship;

wherein the system control module controls the laser power of the laser generator according to the control parameters in the run mode.

15. The laser power control circuit of claim 14, wherein the system control module further comprises:

a microprocessor coupled to the driving module and the detection module for generating the control parameters in the calibration mode and controlling the laser power of the laser generator according to the control parameters in the run mode.

16. The laser power control circuit of claim 14, wherein the system control module further comprises:

a photosensor for converting at least one portion of the laser generated by the laser generator into a voltage signal;

a calibration module coupled to the photosensor for generating the control parameters according to the voltage signal in the calibration mode; and a microprocessor coupled to the driving module for controlling the laser power of the laser generator according to the control parameters in the run mode;

wherein the calibration module is coupled to the microprocessor in the calibration mode, and the photosensor and the calibration module are capable of being removed from the system control module in the run mode.

17. The laser power control circuit of claim 16, wherein the calibration module is a computer.

18. A laser power control method comprising:
  (a) respectively generating a first write channel target value, a second write channel target value, a first overdrive channel target value and a second overdrive channel target value in a calibration mode;
  (b) driving a laser generator, the step of driving the laser generator comprising:
    (b-1) generating a first write channel signal and a second write channel signal according to the first and second write channel target values, respectively;
    (b-2) driving the laser generator according to the first and second write channel signals; and
    (b-3) generating a first overdrive channel signal and a second overdrive channel signal according to the first and second overdrive channel target values, respectively;
  (c) detecting a first laser power value and a second laser power value of the laser generator, the first and second laser power values respectively corresponding to the first and second write channel signals;
  (d) determining a first mapping relationship between a write channel target value and a laser power value according to the first and second write channel target values and the first and second laser power values;
  (e) determining a predetermined write channel target value corresponding to a predetermined laser power value according to the first mapping relationship in a run mode; and
  driving a laser generator driving unit coupled to the laser generator according to a second duty cycle to drive the laser generator according to the first and second overdrive channel signals.

19. The laser power control method of claim 18, further comprising:
  adjusting the first and second write channel signals according to the first and second laser power values, respectively.

20. The laser power control method of claim 18, wherein step (b-1) further comprises:
  storing the first and second write channel target values; and
  performing digital-to-analog conversion according to the first and second write channel target values to generate the first and second write channel signals, respectively.

21. The laser power control method of claim 18, further comprising:
  driving a laser generator driving unit coupled to the laser generator according to a first duty cycle to drive the laser generator according to the first and second write channel signals.

22. The laser power control method of claim 21, further comprising:
  calculating the first mapping relationship; and
  controlling the first duty cycle.

23. The laser power control method of claim 21, wherein step (c) further comprises detecting a third laser power value and a fourth laser power value of the laser generator, the third and fourth laser power values respectively correspond to the first and second overdrive channel signals, and the laser power control method further comprises:
  determining a second mapping relationship between an overdrive channel target value and a laser power value according to the first mapping relationship, the first and second overdrive channel target values, and the third and fourth laser power values;
  wherein step (e) further comprises determining a predetermined overdrive channel target value corresponding to a predetermined laser power value according to the first and second mapping relationships in the run mode.

24. The laser power control method of claim 23, further comprising:
  calculating the first and second mapping relationships; and
  controlling the first and second duty cycles.

25. The laser power control method of claim 21, wherein step (b-3) further comprises:
  storing the first and second overdrive channel target values; and
  performing digital-to-analog conversion according to the first and second overdrive channel target values to generate the first and second overdrive channel signals, respectively.

26. The laser power control method of claim 21, wherein the second duty cycle is equal to the first duty cycle.

27. The laser power control method of claim 18, wherein step (c) further comprises detecting a third laser power value and a fourth laser power value of the laser generator, the third and fourth laser power values respectively correspond to the first and second overdrive channel signals, and the laser power control method further comprises:
  determining a second mapping relationship between an overdrive channel target value and a laser power value according to the first mapping relationship, the first and second overdrive channel target values, and the third and fourth laser power values;
  wherein step (e) further comprises determining a predetermined overdrive channel target value corresponding to a predetermined laser power value according to the first and second mapping relationships in the run mode.

28. The laser power control method of claim 27, further comprising:
  calculating the first and second mapping relationships; and
  controlling the second duty cycle.

29. The laser power control method of claim 18, wherein step (b-3) further comprises:
  storing the first and second overdrive channel target values; and
  performing digital-to-analog conversion according to the first and second overdrive channel target values to generate the first and second overdrive channel signals, respectively.

30. The laser power control method of claim 18, wherein step (c) further comprises:
  converting at least one portion of the laser generated by the laser generator into a voltage signal; and
  performing sample/hold (S/H) operation according to the voltage signal.

31. The laser power control method of claim 18, further comprising:
  (f) generating a plurality of control parameters in the calibration mode, the control parameters at least having information corresponding to the first mapping relationship;
  (g) storing the control parameters; and (h) controlling the laser power of the laser generator according to the control parameters in the run mode.

32. The laser power control method of claim 31, further comprising:
executing steps (f), (g), and (h) utilizing a microprocessor.

33. The laser power control method of claim 31, further comprising:
converting at least one portion of the laser generated by the laser generator into a voltage signal utilizing a photosensor;
executing step (f) according to the voltage signal utilizing a calibration module coupled to the photosensor;
executing steps (g) and (h) utilizing a microprocessor; and
coupling the calibration module to the microprocessor to execute step (f);
wherein the photosensor and the calibration module are capable of being removed in the run mode.

34. The laser power control method of claim 33, wherein the calibration module is a computer.

35. A laser power control circuit comprising:
a system control module for respectively generating a first write channel target value and a second write channel target value in a calibration mode, and generating a first overdrive channel target value and a second overdrive channel target value in the calibration mode;
a driving module coupled to the system control module for driving a laser generator, the driving module comprising:
a write channel control module for generating a first write channel signal and a second write channel signal according to the first and second write channel target values, respectively;
a laser generator driving unit coupled to the write channel control module for driving the laser generator according to the first and second write channel signals; and
an overdrive channel control module coupled to the laser generator driving unit and the system control module for generating a first overdrive channel signal and a second overdrive channel signal according to the first and second overdrive channel target values, respectively; and
a detection module for detecting a first laser power value and a second laser power value of the laser generator, the first and second laser power values respectively corresponding to the first and second write channel signals;
wherein the system control module determines a first mapping relationship between a write channel target value and a laser power value according to the first and second write channel target values and the first and second laser power values, and the system control module determines a predetermined write channel target value corresponding to a predetermined laser power value according to the first mapping relationship in a run mode; and the system control module further comprises:
a logic control unit arranged to drive the laser generator driving unit according to a first duty cycle, in order to drive the laser generator according to the first and second write channel signals, and further drive the laser generator driving unit according to a second duty cycle, in order to drive the laser generator according to the first and second overdrive channel signals.

36. A laser power control method comprising:
(a) respectively generating a first write channel target value and a second write channel target value in a calibration mode, wherein step (a) further comprises:
outputting a first overdrive channel target value and a second overdrive channel target value in the calibration mode;
(b) driving a laser generator, the step of driving the laser generator comprising:
(b-1) generating a first write channel signal and a second write channel signal according to the first and second write channel target values, respectively;
(b-2) driving the laser generator according to the first and second write channel signals; and
(b-3) generating a first overdrive channel signal and a second overdrive channel signal according to the first and second overdrive channel target values, respectively;
(c) detecting a first laser power value and a second laser power value of the laser generator, the first and second laser power values respectively corresponding to the first and second write channel signals;
(d) determining a first mapping relationship between a write channel target value and a laser power value according to the first and second write channel target values and the first and second laser power values;
(e) determining a predetermined write channel target value corresponding to a predetermined laser power value according to the first mapping relationship in a run mode;
driving a laser generator driving unit coupled to the laser generator according to a first duty cycle to drive the laser generator according to the first and second write channel signals; and
driving the laser generator driving unit according to a second duty cycle to drive the laser generator according to the first and second overdrive channel signals.

* * * * *